US005110651A

United States Patent [19]

Massard et al.

[11] Patent Number: 5,110,651

[45] Date of Patent: May 5, 1992

[54] DIELECTRIC OR MAGNETIC ANISOTROPY LAYERS, LAMINATED COMPOSITE MATERIAL INCORPORATING SAID LAYERS AND THEIR PRODUCTION PROCESS

[75] Inventors: Thierry Massard, Paris; Claude Barbalat, les Ulis; Jean-Jacques Lefevre, Guigneville, all of France

[73] Assignee: Commissariat a l'Energie Atomique, Paris, France

[21] Appl. No.: 596,869

[22] Filed: Oct. 12, 1990

[30] Foreign Application Priority Data

Oct. 23, 1989 [FR] France ............................ 89 13840

[51] Int. Cl.⁵ ............................................ B32B 5/12

[52] U.S. Cl. ................................ 428/105; 428/113; 428/114; 428/229; 428/284; 428/296; 428/298; 428/373; 428/402; 174/35 MS; 342/1; 342/2; 342/3; 342/4

[58] Field of Search ............... 428/105, 113, 229, 114, 428/373, 294, 278, 247, 284, 296, 402, 900, 364; 342/1, 2, 3, 4, 5, 6; 156/63; 264/171, 103, 221.2; 174/35 MS

[56] References Cited

U.S. PATENT DOCUMENTS

| | | | |
|---|---|---|---|
| 2,771,602 | 11/1956 | Kuhnhold | 342/1 |
| 2,951,247 | 8/1960 | Halpern | 342/1 |
| 3,721,982 | 3/1973 | Wesch | 342/1 |
| 4,627,950 | 12/1986 | Matsui | 264/103 |
| 4,725,490 | 2/1988 | Goldberg | 428/292 |
| 4,726,980 | 2/1988 | Ishikawa | 428/212 |
| 4,728,554 | 3/1988 | Goldberg | 428/113 |
| 4,996,097 | 2/1991 | Fischer | 428/422 |

FOREIGN PATENT DOCUMENTS

| | | | |
|---|---|---|---|
| 99800 | 7/1980 | Japan | 342/1 |

*Primary Examiner*—Ellis P. Robinson
*Assistant Examiner*—Nasser Ahmad

[57] ABSTRACT

Dielectric or magnetic anisotropy layers, laminated composite material incorporating said layers and their production process. The laminated material has at least two stacks of assembled layers, a first stack constituted by a layer (2) of first dielectric fibers (4) oriented parallel to a first direction (x), and a layer (6) of first magnetic fibers (8) oriented parallel to a second direction (y) perpendicular to the first direction (x), and a second stack constituted by a layer (10) of second dielectric fibers (12) oriented parallel to the second direction (y), and a layer (14) of second magnetic fibers oriented parallel to the first direction (x). Each fiber is constituted by a thermoplastic polymer sheath containing a pulverulent magnetic or dielectric charge.

8 Claims, 2 Drawing Sheets

Figure 4:
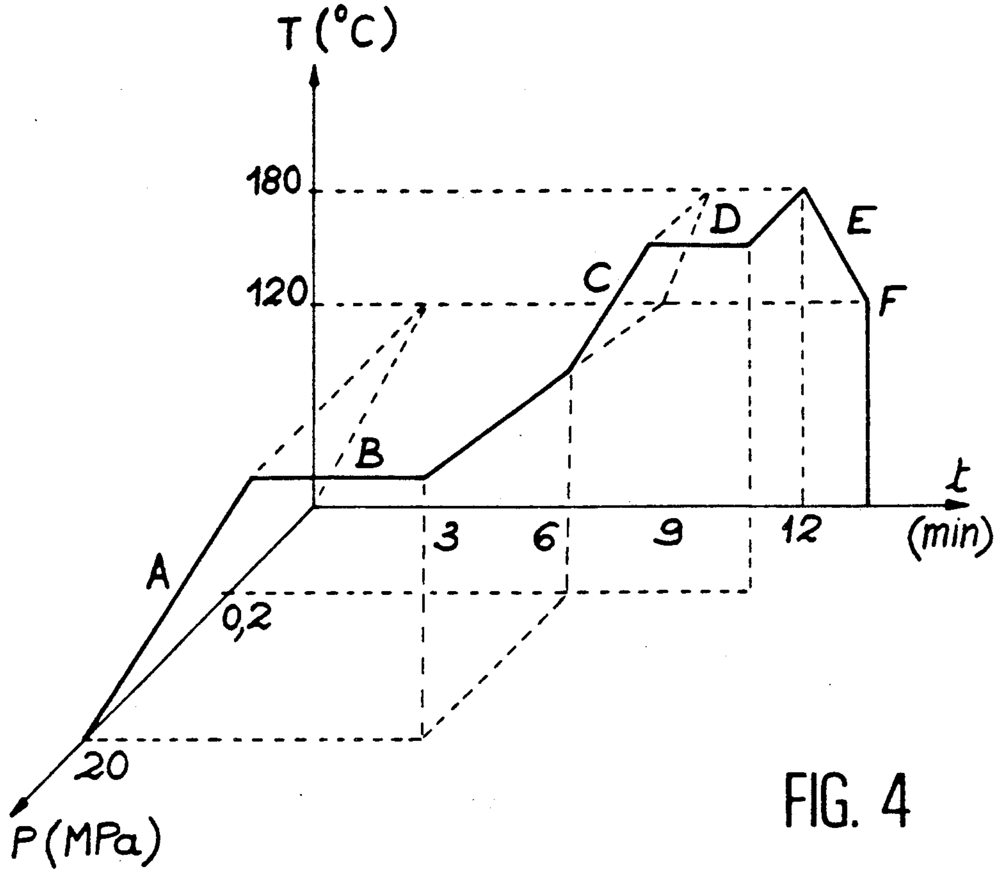

FIG. 1
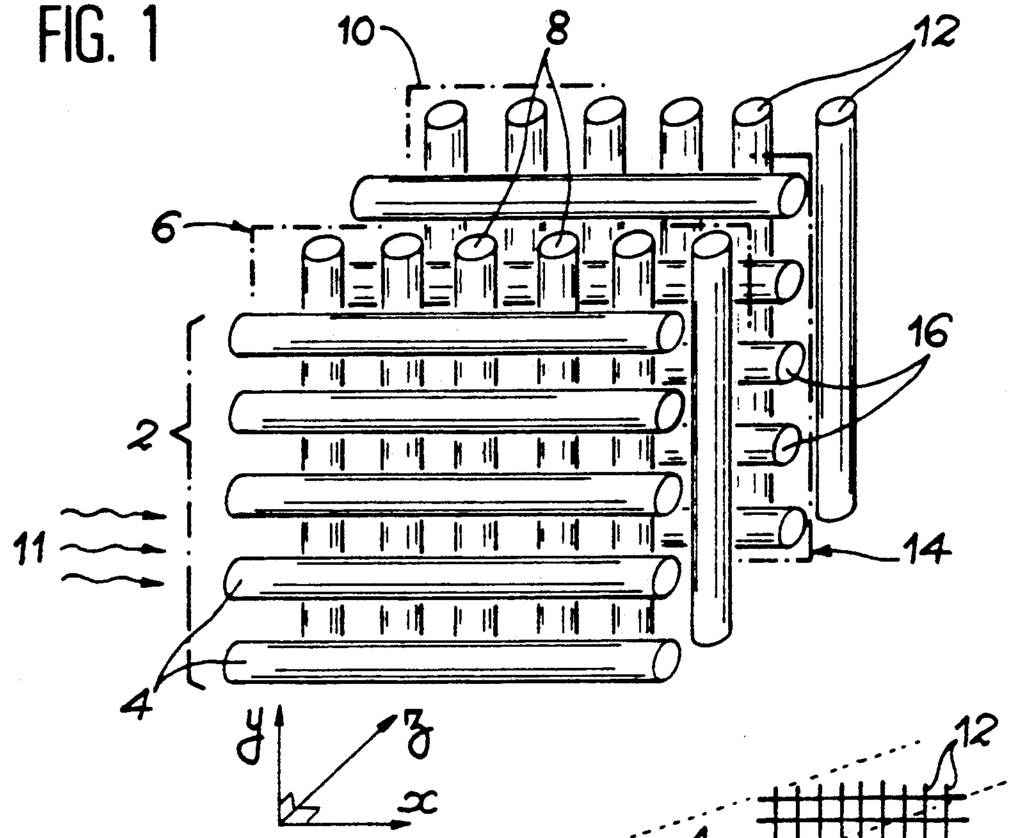
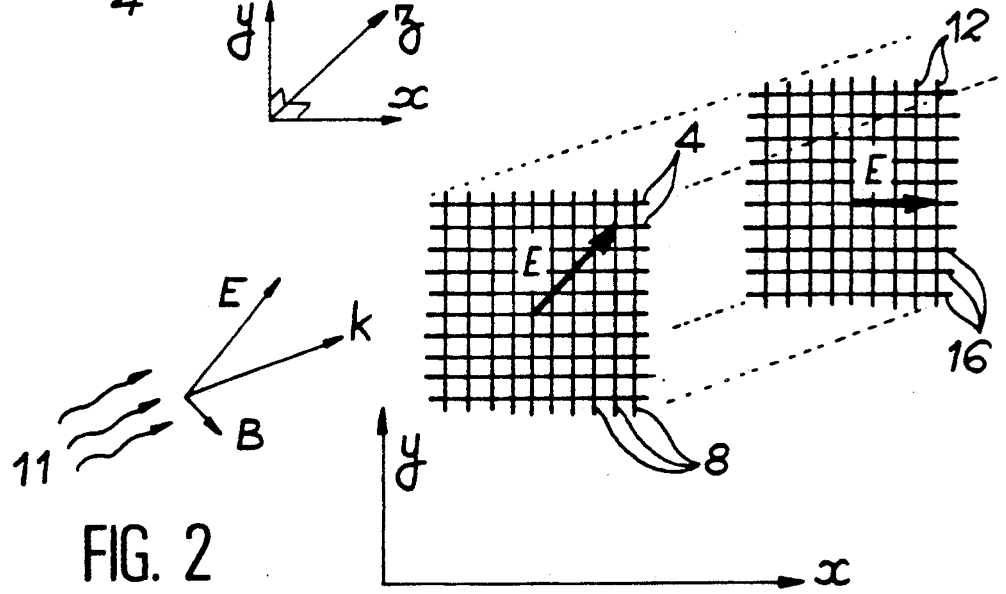
FIG. 2
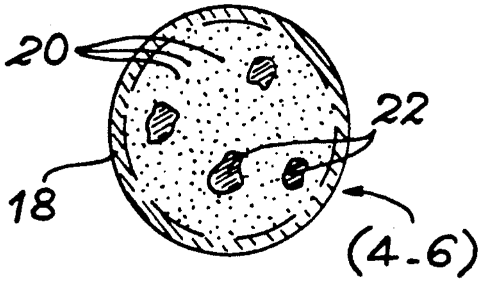
FIG. 3

DIELECTRIC OR MAGNETIC ANISOTROPY LAYERS, LAMINATED COMPOSITE MATERIAL INCORPORATING SAID LAYERS AND THEIR PRODUCTION PROCESS

DESCRIPTION

The present invention relates to dielectric or magnetic anisotropy layers for the production of a laminated composite material having absorbing electromagnetic properties, as well as to the production process for the same.

In particular, said material can be used as a microwave absorber in a broad wavelength range. It can be used as a material for coating an anechoic chamber, as an electromagnetic filter or as an electromagnetic shield more particularly used in the telecommunications and data processing field (shielding for complex circuits, computers, etc.) as well as an in microwave ovens.

In the case of microwave ovens, the material according to the invention is to be placed within the oven door.

The composites makes it possible to obtain electrical permittivity and magnetic permeability materials appropriate for each type of use.

The presently known microwave absorbing materials are in the form of thin layers of films with a thickness of a few centrimetres, which are made with dense materials such as ferrite, or from the dispersion of said materials in an appropriate organic binder.

The invention relates to thin dielectric or magnetic anisotropy layers for the production of a novel electromagnetic wave-absorbing composite.

More specifically, the present invention relates to a laminated composite material having at least two stacks of assembled layers, a first stack constituted by a layer of first dielectric fibers, oriented parallel to a first direction, and a layer of first magnetic fibers, oriented parallel to a second direction perpendicular to the first direction, and a second stack constituted by a layer of second dielectric fibers, oriented parallel to the second direction, and a layer of second magnetic fibers oriented parallel to the first direction.

The alternation of the layers with magnetic and dielectric properties on the one hand and the alternation of the dielectric and magnetic anisotropy direction on the other, due to the direction change of the fibers between the individual layers, make it possible to reestablish an electromagnetic behaviour isotropy for the composite material.

This arrangement of the dielectric and magnetic fibers makes it possible to obtain composites with adapted electric permittivity and magnetic permeability, whose values are equivalent to the arithmetic means of the values of the components of each layer, weighted by the thicknesses of said layers.

In such a configuration, the first layer stack behaves in the manner of a polarizer and consequently the assembly is isotropic. Thus, an electromagnetic wave in contact with said first stack can be highly attenuated and the reflection of said wave can be zero if the impedance matching is brought about with the propagation medium of the wave. In the same way, the second stack serves as a polarizer, said polarizer intersecting the first polarizer at 90°.

By acting on the values for the electric permittivity and magnetic permeability of each fiber layer, it is possible to obtain said impedance matching with the propagation medium, as well as a high absorption of said wave. In order to achieve this, use is made of magnetic materials and dielectric materials having overall the relation $\epsilon=\mu$, i.e. having an impedance equal to that of vacuum.

Moreover, the impedance matching between the propagation medium and the composite can also be obtained if the medium in contact with the composite has an impedance differing from that of the vacuum.

Thus, the electric permittivity of the first and second dielectric fibers is approximately equal to the magnetic permeability of the first and second magnetic fibers and the magnetic permeability of the first and second dielectric fibers is approximately equal to the electric permittivity of the first and second magnetic fibers.

In order to simplify the production of the composite, use is preferably made of first and second dielectric fibers made from the same material, although it is possible to use different materials for said first and second dielectric fibers.

In the same way, preference is given to the use of the same magnetic material for forming the different magnetic layers, although it is possible to use different materials for the individual layers.

The aforementioned double condition is a prior easier to achieve by the use of two different materials, one having a high electric permittivity $\epsilon 1$ and low magnetic permeability $\mu 1$, the other material having a low electric permittivity $\epsilon 2$ and a high magnetic permeability $\mu 2$. The presence in the equations of $\epsilon$ and $\mu$ of high and low imaginary parts makes it possible to obtain a high wave absorption.

As material pairs satisfying the overall equation $\epsilon=\mu$, reference can be made to magnetic ferrites and dielectric ceramics such as titanates and in particular barium titanate/zinc and nickel ferrite. It is also possible to use the pair $SiO_2$-$Co_xNb_yZr_z$ (with x between 80 and 95 and $y+z$ equalling $100-x$) or the pair FeNiCo-$SiO_2$.

Advantageously, the dielectric fibers are constituted by a polymer sheath containing a dielectric charge. The magnetic fibers are constituted by a polymer sheath containing a magnetic charge.

As a function of the process used for producing the fibers, it is possible to use either thermoplastic polymers, or thermosetting polymers. Preference is given to the use of thermoplastic polymers. Thermoplastic polymers which can be used in the formation of the sheath are polyamides, polyesters, polyphenylenes, polypropylenes, polyethylenes, silicones, etc.

As a function of the envisaged applications, the dielectric and/or magnetic fibers can receive a structural reinforcement with a view to improving their mechanical behaviour or strength. The reinforcing means can be constituted either by powder, fibers, glass, carbon, polymer and similar filaments, etc.

The invention also relates to a process for the production of a laminated composite material such as that described hereinbefore. This process essentially comprises the following stages:

a) forming at least one layer of first parallel dielectric fibers,
b) forming at least one layer of first parallel magnetic fibers,
c) forming at least one first stack of layers of first dielectric fibers and first magnetic fibers in such a way that the first dielectric fibers and the first magnetic fibers are perpendicular, d) forming at least one layer of second parallel dielectric fibers, e) forming at least one layer of second parallel magnetic fibers, f) forming at least one second stack of layers of second dielectric fibers and second magnetic fibers in such a way that the second dielectric fibers and the second magnetic fibers are perpendicular, g) assembling the first and second stacks in such a way that the first and second respectively dielectric and magnetic fibers are perpendicular.

Preferably, the enveloping of the magnetic or dielectric charge in a polymer sheath takes place by coextruding a thermoplastic polymer and the respectively dielectric or magnetic charge and, if necessary, the reinforcing means. In particular, the magnetic and dielectric charges are in the form of powder with a grain size of 10 to 50 micrometers.

The function of the polymer sheath is to hold or maintain the magnetic and dielectric charges, permit the transformation of said fibers into a thin layer and give an anisotropy of the properties of the charges.

The invention also relates to a process for the production of a dielectric or magnetic anisotropy layer, having the following stages:

a) enveloping a magnetic or dielectric charge in a thermoplastic polymer sheath to form fibers, b) winding the fibers onto a planar support, c) cold compacting the coil obtained in b) to form a layer of fibers, d) first hot pressing of the layer obtained in c) in the temperature range of the pseudo-rubber plate of the polymer, e) second hot pressing of the layer obtained in d) at a temperature leading to the melting of the polymer.

The first hot pressing makes it possible to produce a continuous layer of fibers and the second hot pressing leads to the welding or sealing of the polymer sheath. This two-stage hot pressing makes it possible to keep the polymer sheaths around the charge and thus maintain the magnetic or dielectric anisotropy of the layers, fixed by the orientation of the fibers forming them.

The invention also relates to thin dielectric or magnetic anisotropy layers obtained by said process for the production of the laminated composite material.

The invention is described in greater detail hereinafter relative to non-limitative embodiments and the attached drawings, wherein show:

FIG. 1 Diagrammatically and in perspective a composite according to the invention.

FIG. 2 The principle of the absorption of microwaves by the material according to the invention.

FIG. 3 Diagrammatically and in section a magnetic or dielectric fiber used in the material according to the invention.

FIG. 4 The theoretical pressure/temperature cycle as a function of the time used for producing the composite according to the invention.

Figure 5:
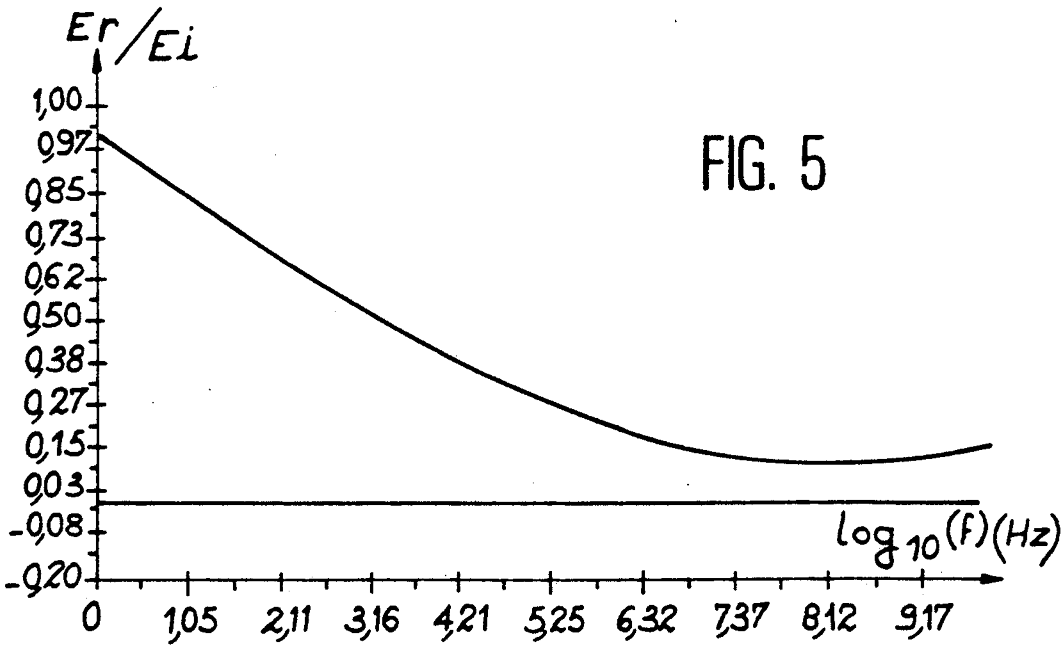

FIG. 5 The absorption efficiency values of a material according to the invention as a function of the frequency of the incident wave.

The laminated composite material according to the invention is constituted by an alternation of thin anisotropic magnetic and dielectric layers, joined together by bonding with the aid of an electrically insulating, adhesive film of the epoxy or polyester adhesive type, or with the aid of an insulating frame. The number of stacked layers is a function of the envisaged application or use. Generally, said number is a multiple of four. The total thickness of the material can vary between 0.6 and 6 mm.

The composite shown in FIGS. 1 and 2 has a first thin layer 2 of dielectric fibers 4 oriented parallel to the direction x of an orthonormal system xyz. With said dielectric fiber layer 2 is associated a thin layer 6 of magnetic fibers 8 oriented parallel to the direction y.

In FIG. 1, the fibers of the different layers are shown in noncontiguous manner, so as to make it easier to see the structure of the material, although in practice said fibers are contiguous. Moreover, these layers are placed in contact with one another.

The dielectric fibers 4 have a high electric permittivity $\epsilon 1$ and a low magnetic permeability $\mu 1$. In parallel, the magnetic fibers 8 have a high magnetic permeability $\mu 2$ and a low electric permittivity $\epsilon 2$.

The adjustment $\mu 2=\epsilon 1$ and $\mu 1=\epsilon 2$ of the fibers 8 and 4 makes it possible to obtain a composite overall satisfying the equation $\epsilon=\mu$, i.e. having an impedance equal to that of the vacuum.

It is pointed out that $\epsilon$ and $\mu$ satisfy the equations $$\epsilon=\epsilon'+j\epsilon'' \quad (1)$$

and $$\mu=\mu'+j\mu''. \quad (2)$$

The presence of a high and equal imaginary part in $\epsilon$ and $\mu$ makes it possible to obtain a high absorption of an electromagnetic wave 11 striking the stack of layers 2–6.

With all the calculations made, a high propagation factor a1 is obtained in the direction x corresponding to high $\epsilon''$ and $\mu''$ and a low propagation factor a2 in the perpendicular direction y satisfying the following equations:

$$a1 = jw\sqrt{\epsilon 1 \cdot \mu 2}$$

$$a2 = jw\sqrt{\epsilon 2 \cdot \mu 1}$$

Under these conditions, an electromagnetic wave 11 striking the layer 2 and then propagating in the stack of layers 2–6 is polarized and the components E1 and B2 of the electric and magnetic fields of said wave, respectively parallel to x and y, are highly attenuated. Therefore the stack 2–6 serves as a polarizer.

In order to attenuate the other pair of components E2 and B1 of the incident wave 11, respectively parallel to y and x in the composite, it is merely necessary to add a second group of fibers.

This second group comprises a thin layer 10 of dielectric fibers 12 parallel to one another, but perpendicular to the dielectric fibers 4. In other words, the dielectric fibers 12 are parallel to the direction y. Furthermore, the dielectric anisotropy layer 10 is in contact with the magnetic anisotropy layer 8.

With these dielectric fibers 12 is associated a thin layer 14 of magnetic fibers 16 parallel to one another and to the direction x, but perpendicular to the dielectric fibers 12, as well as to the magnetic fibers 8.

The material constituting the fibers 12 and 16 also satisfy the overall relation $\epsilon=\mu$. The dielectric fibers 12 are produced from the same material as the dielectric fibers 4 and the magnetic fibers 16 are made from the same material as the magnetic fibers 8.

The stack of layers 10–14 constitutes a second polarizer intersecting the first polarizer 2–6 at 90°.

In the manner shown in FIG. 3, dielectric 4 or magnetic 6 fibers are constituted by a thin, thermoplastic, polymer sheath 18 containing a respectively dielectric or magnetic pulverulent charge 20, together with reinforcing fibers 22.

In particular, the sheath 18 is of 0.010 to 0.015 mm thick polyamide 12 and contains glass fibers 22 and a powder 20 of barium titanate or a nickel and zinc ferrite as a function of whether these fibers are dielectric or magnetic. The external diameter of the fibers is 0.2 to 0.7 mm.

These fibers have charge weight contents of more than 50 and in particular more than 95% and charge volume contents of approximately 60%. The charge is in the form of a powder with a grain size of 10 to 50 micrometers.

The production of each layer of dielectric or magnetic fibers will now be described. The dielectric or magnetic fibers described relative to FIG. 3 and used in the formation of the composites according to the invention are produced by the coextrusion of the polymer, the charge and the reinforcing fibers. As a known coextrusion process usable in the invention, reference can be made to that described in Techniques de l'Ingenieur 3240-1 to 4 "Preimpregne souple a matrice thermoplastique (FIT)" by Ganga and Bourdon. This coextrusion makes it possible to produce fibers in a reproducible form and adaptable to the different charge characteristics taking account of their particular castability condition.

The fibers produced are then shaped by contiguous winding over one or two thicknesses onto planar mandrels. The plates obtained are then cold compacted under a pressure of 200 MPa in hydrostatic pressure vessels. Finally, the material is transformed under platen presses.

This final hot pressing stage takes place by plastic deformation of the polymer sheath followed by a melting under pressure thereof. Plastic transformation is an irreversible transformation carried out at constant pressure in the temperature range of the psuedo-rubber plate of the polymer constituting the fiber sheath.

The thin fiber layers obtained have a thickness of 0.2 to 0.5 mm, as a function of the initial diameter of the fibers and the number of layers wound onto the mandrels.

FIG. 4 shows the final stage of transforming the fibers into thin layers for polyamide sheaths. This graph gives the pressure and temperature variations expressed respectively in MPa and °C. as a function of the time in minutes.

Zone A corresponds to a temperature rise from 0° to 100° C. under a pressure of 20 MPa. Zone B corresponds to the plastic deformation zone of the fiber sheath at 120° C. under a pressure of 20 MPa. This stage makes it possible to form a continuous layer, whilst ensuring that it retains its dielectric or magnetic anisotropy. Zone C corresponds to a temperature rise from 100° to 160° C. under a reduced pressure of 0.2 MPa. Zone D corresponds to a temperature rise from 160° to 180° C. under a pressure of 0.2 MPa. This stage leads to the melting of the polymer and ensures the adhesion of the polymer sheaths. Zone E represents a cooling without pressure in order to limit flow or creep of the material, whilst stage F represents demoulding at 120° C.

The dielectric and magnetic material layers produced in the manner described hereinbefore are then stacked and assembled to produce absorbing electromagnetic shields in the manner described relative to FIGS. 1 and 2.

This production process for dielectric or magnetic anisotropy layers can be used for producing materials other than those described in FIGS. 1 and 2. In particular, it can be used for the production of an essentially magnetic or essentially dielectric shield.

The curve of FIG. 5 gives the ratio Er/Ei as a function of the frequency of the incident electromagnetic wave. Ei and Er represent the energy of the electromagnetic wave to be absorbed, which is respectively incident and reflected by the material according to the invention and the frequencies are expressed in logarithmic form.

The curve of FIG. 5 was obtained for a composite constituted by four orthotropic layers, i.e. that shown in FIG. 1, the dielectric charge beig barium titanate and the magnetic charge nickel and zinc ferrite. It can be gathered from this curve that the composite has a maximum absorption efficiency of 18 db at 1000 MHz and an efficiency of 16.5 db between 10 and 800 MHz.

Therefore the materials according to the invention are able to absorb harmful electromagnetic effects over extensive band widths with an adequate efficiency for attenuating 90 to 99% of the incident wave.

What is claimed is:

1. Thin continuous dielectric or magnetic anisotropy layer consisting essentially of hot compacted contiguous fibers (4,6) parallel to a pre-determined direction (x,y) and consisting essentially of a thermoplastic polymer sheath containing a magnetic or dielectric pulverulent charge core having homogeneous grains with a size of 10 to 50 μm and optionally reinforcing means (22), the cohesion of the fibers of the layer resulting from the melting of the polymer.

2. Thin layer according to claim 1, characterized in that the polymer sheath (18) is of polyamide.

3. Thin layer according to claim 1, characterized in that the dielectric charge is a barium titanate powder.

4. Thin layer according to claim 1, characterized in that the magnetic charge is a zinc and nickel ferrite powder.

5. Thin layer according to claim 1, characterized in that the reinforcing means (22) are in the form of fibers.

6. Laminated composite material having at least two stacks of assembled layers, a first stack consisting essentially of an anisotropic layer (2) of first joined dielectric fibers (4) oriented parallel to a first direction (x) and an anisotropic layer (6) of first joined magnetic fibers (8) oriented parallel to a second direction (y) perpendicular to the first direction (x) and a second stack consisting essentially of an anisotropic a layer (10) of second joined dielectric fibers (12) oriented parallel to the second direction (y) and an anisotropic layer (14) of second joined magnetic fibers oriented parallel to the first direction (x), wherein said fibers consist essentially of a polymer sheath (18) containing a dielectric or magnetic charge core (20) having homogeneous grain size of 10 to 50 μm and optionally reinforcing means (22).

7. Composite material according to claim 6, characterized in that the electric permittivity respectively of the first and second dielectric fibers (4,12) is approximately equal to the magnetic permeability respectively of the first and second magnetic fibers (8,16) and in that the magnetic permeability respectively of the first and second dielectric fibers (4,12) is approximately equal to the electric permittivity respectively of the first and second magnetic fibers (8.16).

8. Composite material according to claim 6, characterized in that the dielectric fibers are of barium titanate and the magnetic fibers are of zinc and nickel ferrite.

* * * * *